United States Patent [19]

Sims et al.

[11] Patent Number: 4,982,383
[45] Date of Patent: Jan. 1, 1991

[54] DOWNHOLE ULTRASONIC TRANSIT-TIME FLOWMETERING MEANS AND METHOD

[75] Inventors: Jackie C. Sims; Irwin R. Supernaw, both of Houston, Tex.

[73] Assignee: Texaco Inc., White Plains, N.Y.

[21] Appl. No.: 251,276

[22] Filed: Sep. 30, 1988

[51] Int. Cl.$^5$ ............................................. G01S 15/00
[52] U.S. Cl. ................................... 367/89; 73/861.18
[58] Field of Search ........................... 367/89, 902, 27; 73/861.29, 861.31, 861.18, 155

[56]  References Cited
U.S. PATENT DOCUMENTS 3,906,791 9/1975 Lynnworth ...................... 73/861.29
3,954,008 5/1976 Yamamoto et al. .............. 73/861.29
4,452,077 6/1984 Siegfried, II ..................... 73/861.31

Primary Examiner—Thomas H. Tarcza
Assistant Examiner—Daniel T. Pihulic
Attorney, Agent, or Firm—Robert A. Kulason; James J. O'Loughlin; Ronald G. Gillespie

[57] ABSTRACT

A sonde in a well logging system of the present invention includes caliper means providing a diameter signal corresponding to the diameter of a borehole traversing an earth formation. First and second transducers which, when so controlled, transmit an ultrasonic acoustical pulse into fluid flowing in the borehole or provides an electrical pulse in accordance with a received acoustical pulse from the fluid. A control network controls both transducers so that during one part of a measurement the first transducer transmits an acoustical pulse into the fluid while the second transducer receives an acoustical pulse after it has passed through the fluid. During another part of the measurement the second transducer is controlled to transmit an acoustical pulse into the fluid while the first transducer is controlled to receive the acoustical pulse after it has passed through the fluid and provides a signal in accordance with the received acoustical pulse. A signal circuit connected to both transducers provides a travel time signal corresponding to the travel times of the acoustical pulses for both parts of the measurement. A conventional well logging cable carries control signals from the surface to the control network and the travel time signal and the diameter signal to surface electronics. The surface electronics includes processing apparatus which provides the control signal to the cable and which derives the flow rate of the fluid flowing in the borehole in accordance with the travel time signal and the diameter signal.

22 Claims, 2 Drawing Sheets

DOWNHOLE ULTRASONIC TRANSIT-TIME FLOWMETERING MEANS AND METHOD

BACKGROUND OF THE INVENTION

Field of the Invention

The present invention relates to well logging tools in general and, more specifically, to well logging tools monitoring the fluid flow in a borehole.

SUMMARY OF THE INVENTION

A sonde in a well logging system of the present invention includes caliper means providing a diameter signal corresponding to the diameter of a borehole traversing an earth formation. First and second transducers which, when so controlled, transmit an ultrasonic acoustical pulse into fluid flowing in the borehole or provide an electrical pulse in accordance with a received acoustical pulse from the fluid. A control network controls both transducers so that during one part of a measurement the first transducer transmits an acoustical pulse into the fluid while the second transducer receives an acoustical pulse after it has passed through the fluid. During another part of the measurement the second transducer is controlled to transmit an acoustical pulse into the fluid while the first transducer is controlled to receive the acoustical pulse after it has passed through the fluid and provides a signal in accordance with the received acoustical pulse. A signal circuit connected to both transducers provides a travel time signal corresponding to the travel times of the acoustical pulses for both parts of the measurement. A conventional well logging cable carries control signals from the surface to the control network and the travel time signal and the diameter signal to surface electronics. The surface electronics includes processing apparatus which provides the control signal to the cable and which derives the flow rate of the fluid flowing in the borehole in accordance with the travel time signal and the diameter signal.

The objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and not to be construed as defining the limits of the invention.

DESCRIPTION OF THE INVENTION

Figure 3:
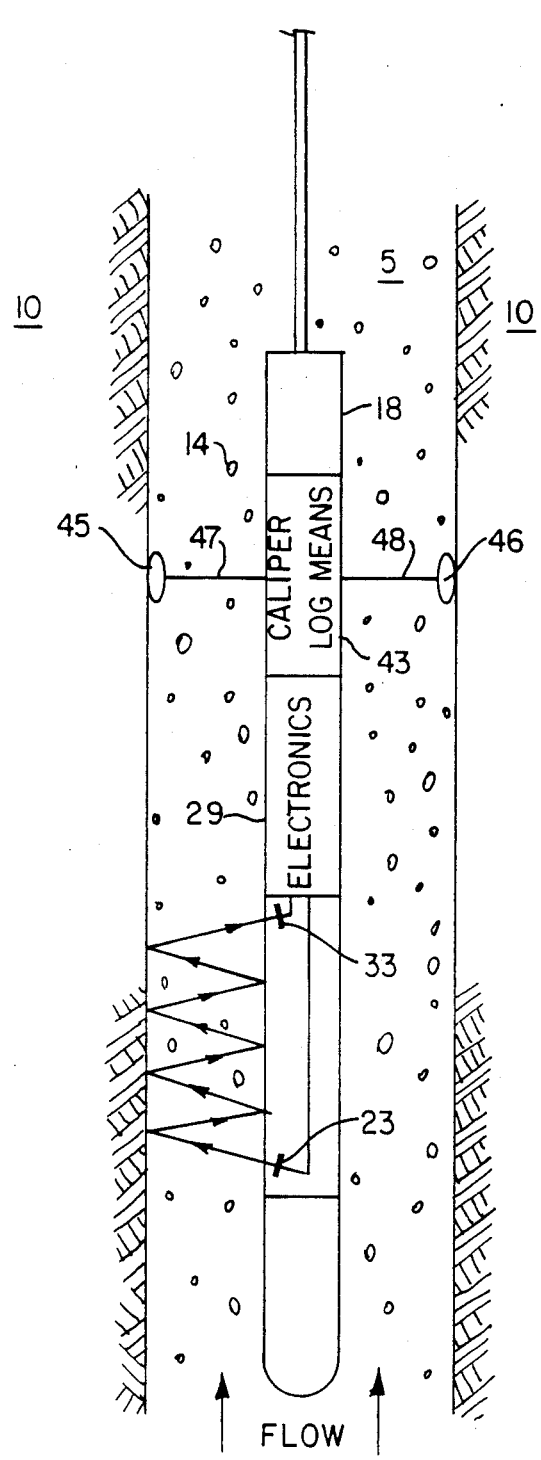
FIG. 3 is a graphical representation of a well logging sonde, constructed in accordance with a second embodiment of the present invention, in a borehole emitting acoustical waves into the fluid flowing in the borehole and receiving the acoustical waves in accordance with the second embodiment of the present invention.

One of the primary applications of production logging is to determine the oil and water flow rates at various depths in a well. These rates are calculated from the measurements of water holdup and total flow. The accuracy of the results is greatly influenced by both the total flow and water holdup measurements.

In production logging, flow measurements are made almost entirely by spinners or impellers. The total flow rate of the fluid is related to the speed of the spinner which is measured by electrically counting the revolutions per second (RPS) of the impeller. Even though spinners have been widely used for many years and have been greatly improved, they still have many disadvantages and restrictions.

Some of the disadvantages of a spinner flowmeter relate to mechanical effects and others relate to the properties of the fluid and the flow which is being measured. For example, the impeller of the spinner operates on a bearing which wears and requires frequent inspection and replacement to keep frictional effects from influencing the measurements. Another disadvantage, which increases logging time on the well, is that calibration must be done downhole by making several extra logging runs at various logging speeds. In reference to the fluid properties, the spinner speed is not only affected by changes in the velocity of the fluid but also by changes in the viscosity and temperature of the fluid.

One of the major restrictions on spinner flowmeters is that the minimum measurable flow is not low enough to measure all the flow rates of interest in many wells. Logging companies have taken two approaches to overcome this limitation. One approach uses spinners with longer blades or impellers to expose more surface area to the flow. These spinners, called fullbore spinners or flowmeters, do operate at lower flow rates but still suffer from the problems discussed previously. In fact, they may suffer even more since a greater surface area is exposed to the fluid and the flow. An additional mechanical problem is involved because the longer blades of this spinner must be designed and operated to collapse into the standard 1 11/16 inch tool diameter. This constraint is required so the tool can be lowered and raised through the production tubing in the well.

The second approach that has been taken to overcome the minimum flow limitation of the spinner is to divert all the flow in the casing or borehole through the center of the tool where the spinner is located. Since the diameter of the flow is greatly reduced, its velocity will increase to a level where the spinner is operational. The flow is diverted through the center of the tool by using either an inflatable packer (packer flowmeter) or an expandable basket (basket flowmeter).

Both of these diverting flowmeters also suffer from additional mechanical problems. They must not only expand to produce a seal between the tool and the casing or borehole, but they also must collapse into the 1 11/16 inch tool diameter for passage through the production tubing. Since there is no way to ensure a good seal, leakage around the tool is always possible and could cause significant errors in the measured flow.

Calibration of the diverting flowmeters is also questionable. Since a seal is required between the tool and the borehole, only stationary measurements can be made. Thus the logging engineer can not perform the normal downhole calibration by running at different logging speeds. One must calibrate these tools in a flow loop at a test facility, and assume that the calibration remains constant during logging. Initially, such a calibration is probably sufficient, but as the bearing of the spinner wears and as different fluids mixtures and properties are encountered, the calibration may become inaccurate.

One final limitation of the fullbore flowmeter and the diverting flowmeters is that they were designed for low flow rates and can not be operated in some of the higher flows. In many wells, one will be interested in measuring both the low flow rates in the lower zones and the higher rates that develop in the upper portion of the well. Thus in addition to a low flow rate device, a regular spinner must also be run. Since one is normally interested in obtaining other borehole data, the production tool string is usually already configured to its maximum length. Therefore, to run both a regular spinner and a low flow rate meter, an extra trip into the hole will probably be required which will increase the logging cost and the time on the well.

Figure 1:
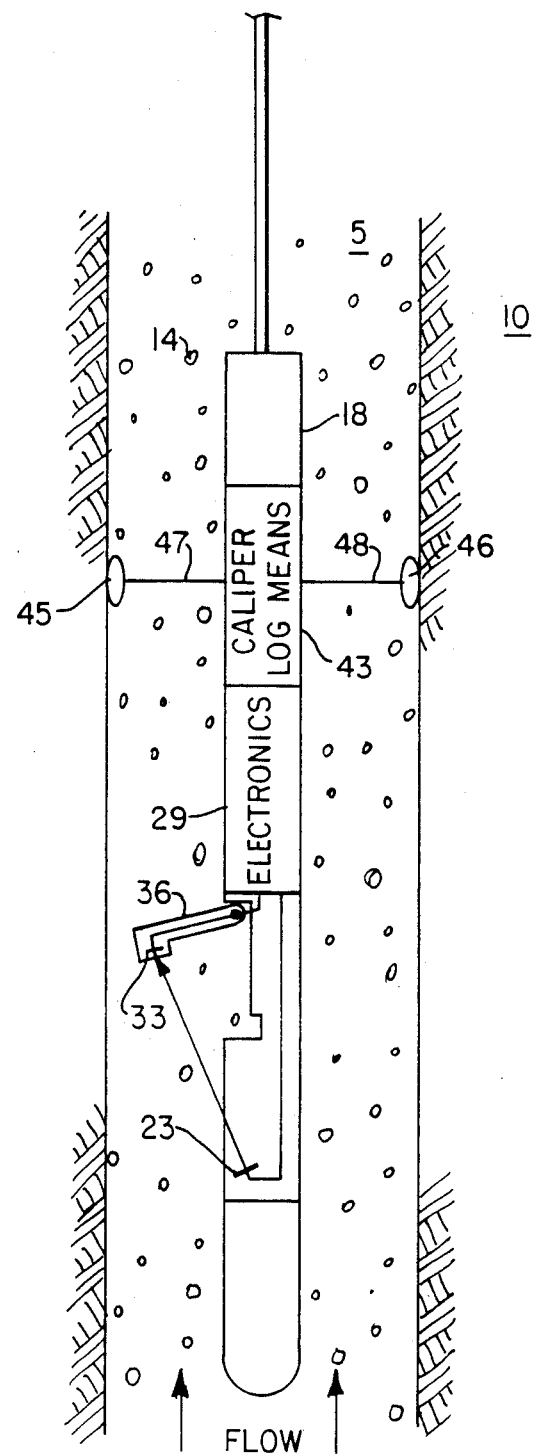
FIG. 1 is a graphical representation of a well logging sonde constructed in accordance with one embodiment of the present invention in a borehole emitting acoustical waves into the fluid flowing in the borehole and receiving the acoustical waves in accordance with one embodiment of the present invention.
Figure 2:
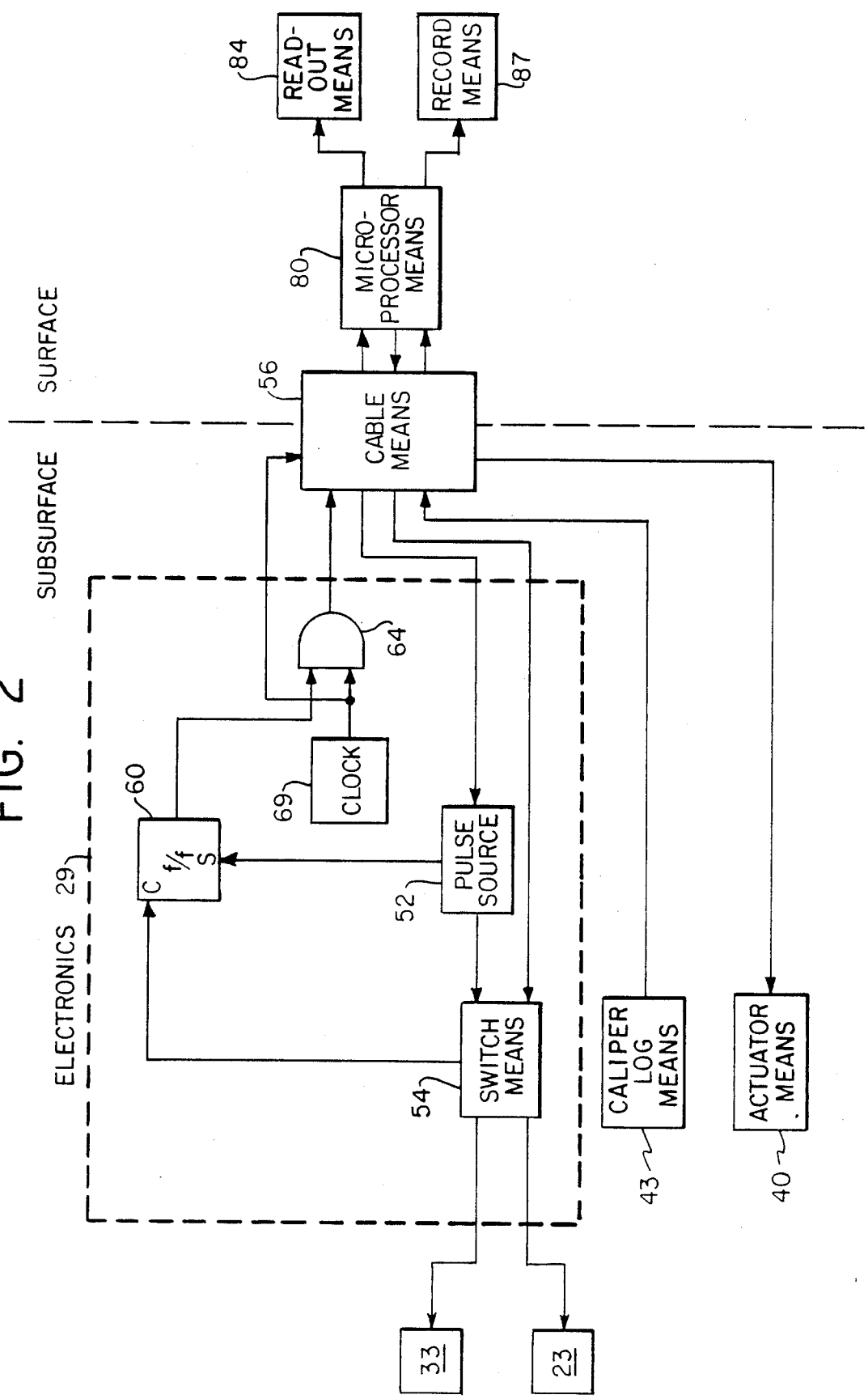
FIG. 2 is a simplified block diagram of the downhole transit-time flowmeter constructed in accordance with the present invention.

The present invention is a downhole ultrasonic transit-time flowmeter which solves many of the problems associated with spinners and provides an improved flow measurement for production logging. With reference to FIGS. 1 and 2 there is shown a borehole 5 traversing an earth formation 10 having fluid flowing upward containing particles or droplets of a different fluid 14.

A conventional well logging sonde 18 contains a conventional type transducer, which is an ultrasonic crystal 23. Electronics 29 provide electrical pulses to transmitter crystal 23, as hereinafter explained, to provide acoustical pulses into the fluid flow. The acoustical pulses pass through the fluid containing particles 14 and impinge upon another transducer, which is a crystal 33, mounted on an arm 36. Arm 36 is initially closed and forms part of sonde 18 as sonde 18 is lowered into and removed from borehole 5. Actuator means 40 is controlled by signals as hereinafter explained to either extend the actuator arm 36 for measurement purposes or to bring it into an initial position for movement of sonde 18 through the borehole. As explained hereinafter during a measurement, the roles of crystals 23, 33 are reversed.

Crystal 23 or 33 provides electrical pulses back to electronics 29 in accordance with the received acoustical pulses. Electronics 29 processes the signal from crystal 23 or 33 and provides a travel-time signal in accordance therewith.

A conventional caliper log means 43 has pads 45 and 46 urged against the wall of borehole 5, by arms 47 and 48, respectively, so as to centralize sonde 18 in borehole 5. Caliper means 43 also provides a signal representative of the diameter of borehole 5 in accordance with the positioning of pads 45 and 46.

Electronics 29 includes a pulse source 52 connected to switching means 54 and to cable means 56 and receiving a signal from cable means 56 to provide a pulse to switching means 54. Switching means 54 is also connected to crystals 23, 33 and to cable means 56. Switching means 54 is controlled by a control signal from cable means 56 during one part of a measurement to provide the pulse from pulse source 52 to crystal 23 and during another part of the measure to provide the pulse from pulse source 52 to crystal 33.

Pulse source 52 also provides a pulse to a set input of a flip-flop 60. Flip-flop 60 has its clear input connected to switching means 54 which provides an electrical pulse corresponding to the first arrival signal from crystal 33 to flip-flop 60 during the one part of the measurement and a similarly-derived signal from crystal 23 during the other part of the measurement. An output of flip-flop 60 is provided to an AND gate 64 which also receives timing pulses from a clock 69. AND gate 64 provides its output to cable means 56.

The output of AND gate 64 will correspond to the transit time for the acoustical pulse to be transmitted from crystal 23 or 33 through the water to crystal 33 or 23. This is accomplished by pulse source 52 providing a pulse to the input of flip-flop 60, triggering flip-flop 60 to a set state thereby causing flip-flop 60 to provide an enabling signal to AND gate 64. The enabling signal causes AND gate 64 to pass the timing pulses from clock 69 to cable means 56. Clock 69 is tied to microprocessor 80 by providing pulses to cable means 56 so as to provide synchronized timing of the system. When crystal 23 or 33 receives an acoustical pulse, it provides an electrical pulse, by way of switching means 54, to the clear input of flip-flop 60 triggering flip-flop 60 to its clear state thereby terminating the enabling signal. The termination of the enabling signal causes AND gate 64 to block the timing pulses from clock 69. Therefore the timing pulses passed by AND gate 64 represent the time of travel of the acoustical pulse from one crystal 23 or 33 to the other crystal 33 or 23.

Cable means 56 provides the passed timing pulses uphole to microprocessor means 80. Cable means 56 also provides the signal from caliper log means 43 uphole to microprocessor means 80. Microprocessor means 80 provides signals to cable means 56 for triggering pulse source 52, and for controlling actuator means 40 and switching means 54. It should be noted that the time between triggering of pulse source 52 should be sufficient to allow any ringing of crystal 33 or 23 by acoustical pulses to have died down so that the next transit time measurement is not inadvertently terminated early by a ringing from the previous part of the measurement.

Thus, microprocessor means 80 will receive pulses corresponding to two travel times for each measurement.

The equations for the two travel times are given below:

$$t_1 = d/(c + v \cos \theta) \quad (1)$$

$$t_2 = d/(c - v \cos \theta) \quad (2)$$

where
$t_1$ = travel time from the crystal 23 to crystal 33
$t_2$ = travel time from the crystal 33 to crystal 23
$c + v \cos \theta$ = velocity traveling with the flow
$c - v \cos \theta$ = velocity traveling against the flow
$c$ = velocity of sound in the fluid
$v$ = velocity of the fluid
$\theta$ = angle between the transmitted pulse and the sonde 18 axis
$d$ = path distance between crystals 23 and 33.

Subtracting Eq (1) from Eq (2) yields:

$$t_2 - t_1 = 2dv \cos \theta / (c^2 - v^2 \cos^2 \theta) \quad (3)$$

Since $c^2 \gg v^2 \cos^2 \theta$, Eq (3) can be reduced to:

$$t^2 - t^1 = 2dv \cos \theta / c^2 \text{ or}$$

$$v = c^2(t_2 - t_1)/(2d \cos \theta) \quad (4)$$

Another equation relating fluid velocity to the travel times can be obtained which is independent of c, the velocity of sound in the fluid. Taking the reciprocal of Eq (1) and (2) gives $$1/t_1 = (c + v \cos\theta)/d \quad (5)$$

$$1/t_2 = (c - v \cos\theta)/d \quad (6)$$

Subtracting Eq (6) from (5) yields $$1/t_1 - 1/t_2 = 2v \cos\theta/d \quad (7)$$

Solving Eq (7) for v $$v = (d/2 \cos\theta)(1/t_1 - 1/t_2) \quad (8)$$

Calibration of the system may be accomplished prior to logging in a flow loop or during logging by running at several different cable speeds. The calibrated fluid velocity will be exact if the tool is run stationary. During a logging run where the tool is moving upwards, the actual fluid velocity will be the indicated velocity minus the velocity of the cable.

The flow rate can be determined from the velocity measurement by the following equation:

$$FR = 1.4(D^2 - s^2)v \quad$$

where
FR = flow rate (barrels per day),
D = diameter of the casing or borehole (inches),
s = diameter of the tool (inches),
v = fluid velocity (ft/min), and
1.4 = unit conversion constant.

The diameter of the borehole or the casing is obtained from a caliper log means 43. The diameter of the sonde 18 is standard 1 11/16 inches.

In another embodiment shown in FIG. 3, arm 36 is eliminated as is actuator means 40. Crystals 23 and 33 are positioned so that the acoustical pulses reflect off the walls of borehole 5 and sonde 18 until they impinge on one of the crystals 23 or 33. The operation of this embodiment is essentially the same as the first embodiment.

What is claimed is:

1. A well logging system for monitoring the flow rate of a fluid flowing in a borehole traversing an earth formation comprising:
   a sonde including therein:
   caliper means for measuring the diameter of the borehole and providing a diameter signal corresponding thereto,
   first and second transducer means, each transducer means being means for transmitting an ultrasonic acoustical pulse into the fluid or for receiving an ultrasonic acoustical pulse from the fluid and providing an electrical pulse corresponding to the received acoustical pulse,
   control means connected to both transducer means for controlling in accordance with control signals both transducer means so that during one part of a fluid flow rate measurement the first transducer means transmits an ultrasonic acoustical pulse and the second transducer means receives an acoustical pulse that has passed through the fluid and so that during another part of the measurement the second transducer means transmits an ultrasonic acoustical pulse into the fluid and the first transducer means receives an ultrasonic acoustical pulse from the fluid, and
   signal means connected to the control means for providing a travel time signal corresponding to the travel times of the acoustical pulses for both parts of the measurement in accordance with the electrical pulses provided by both transducer means;
   cable means connected to the control means and to the signal means for carrying control signals from surface electronics to the control means and for carrying the travel time signal from the signal means and the diameter signal from the caliper means to surface electronics; and
   the surface electronics includes:
   means connected to the cable means for providing the control signals to the cable means, and
   means connected to the cable means for deriving the flow rate of the fluid flowing in the borehole in accordance with the travel time signal and the diameter signal.

2. A system as described in claim in which the control means includes:
   means connected to the cable means for providing at least two pulses in accordance with a first control signal during a measurement, and
   switching means controlled by a second control signal and connected to both transducer means, to the pulse means and to the signal means for applying a first pulse from the pulse means to the first transducer means and for passing an electrical pulse from the second transducer means to the signal means during the one part of the measurement and for applying a second pulse from the pulse source to the second transducer means and for passing an electrical pulse from the first transducer means to the signal means during the other part of the measurement.

3. A system as described in claim 2 in which the signal means includes:
   clock means for providing timing pulses,
   enabling signal means connected to the pulse means, and to the switching means for providing an enabling signal for each part of the measurement in accordance with the pulses from the pulse means and the switching means, and
   means connected to the clock means, to the enabling signal means and to the cable means for passing the timing pulses from the clock means to the cable means as the travel time signal in accordance with the enabling signal from the enabling signal means.

4. A system as described in claim 3 in which the deriving means derives the velocity v of the fluid in accordance with the travel time signals and the following equation:

$$v = (d/2 \cos\theta)(1/t_1 - 1/t_2)$$

where $t_1$ is the travel time of an acoustical pulse from the first transducer means to the second transducer means, $t_2$ is the travel time of an acoustical pulse from the second transducer means to the first transducer means, d is the path distance between the first and second transducer means and $\theta$ is the angle between the transmitted pulse and the sonde axis.

5. A system as described in claim 4 in which the deriving means derives the flow rate of the fluid in the borehole in accordance with the travel time signal, the diameter signal and the following equation:

$$FR = 1.4(D^2 - s^2)v$$

where FR is the flow rate in barrels per day, D is the diameter of the casing or borehole in inches, s is the diameter of the sonde in inches, and 1.4 is the unit conversion constant.

6. A system as described in claim 5 further comprising means for extending one of the transducer means outside of the sonde in such a manner that there is a direct path between both transducer means for an acoustical pulse to travel.

7. A system as described in claim 5 in which the transducer means are spatially arranged with each other so that there is an indirect path between both transducer means.

8. A well logging system for monitoring the velocity of a fluid flowing in a borehole traversing an earth formation comprising:
a sonde including therein:
first and second transducer means, each transducer means being means for transmitting an ultrasonic acoustical pulse into the fluid or for receiving an ultrasonic acoustical pulse from the fluid and providing an electrical pulse corresponding to the received acoustical pulse,
means for extending one of the transducer means outside of the sonde in such a manner that there is a direct path between both transducer means for an acoustical pulse to travel,
control means connected to both transducer means for controlling in accordance with control signals both transducer means so that during one part of a fluid flow rate measurement the first transducer means transmits an ultrasonic acoustical pulse and the second transducer means receives an acoustical pulse that has passed through the fluid and so that during another part of the measurement the second transducer means transmits an ultrasonic acoustical pulse into the fluid and the first transducer means receives an ultrasonic acoustical pulse from the fluid, and
signal means connected to the control means for providing a travel time signal corresponding to the travel times of the acoustical pulses for both parts of the measurement in accordance with the electrical pulses provided by both transducer means;
cable means connected to the control means and to the signal means for carrying control signals from surface electronics to the control means and for carrying the travel time signal from the signal means to surface electronics; and
the surface electronics includes:
means connected to the cable means for providing the control signals to the cable means, and
means connected to the cable means for deriving the velocity of the fluid flowing in the borehole in accordance with the travel time signal and the diameter signal.

9. A system as described in claim 8 in which the control means includes:
means connected to the cable means for providing at least two pulses in accordance with a first control signal during a measurement, and
switching means controlled by a second control signal and connected to both transducer means, to the pulse means and to the signal means for applying a first pulse from the pulse means to the first transducer means and for passing an electrical pulse from the second transducer means to the signal means during the one part of the measurement and for applying a second pulse from the pulse source to the second transducer means and for passing an electrical pulse from the first transducer means to the signal means during the other part of the measurement.

10. A system as described in claim 9 in which the signal means includes:
clock means for providing timing pulses,
enabling signal means connected to the pulse means, and to the switching means for providing an enabling signal for each part of the measurement in accordance with the pulses from the pulse means and the switching means, and
means connected to the clock means, to the enabling signal means and to the cable means for passing the timing pulses from the clock means to the cable means as the travel time signal in accordance with the enabling signal from the enabling signal means.

11. A system as described in claim 10 in which the deriving means derives the velocity v of the fluid in accordance with the travel time signals and the following equation:

$$v = (d/2 \cos \theta)(1/t_1 - 1/t_2)$$

where $t_1$ is the travel time of an acoustical pulse from the first transducer means to the second transducer means, $t_2$ is the travel time of an acoustical pulse from the second transducer means to the first transducer means, d is the path distance between the first and second transducer means and $\theta$ is the angle between the transmitted pulse and the sonde axis.

12. A well logging method for monitoring the flow rate of a fluid flowing in a borehole traversing an earth formation comprising the steps of:
measuring the diameter of the borehole from a sonde in the borehole,
providing a diameter signal corresponding to measured diameter,
using first and second transducers in the sonde, each transducer being capable of transmitting an ultrasonic acoustical pulse into the fluid or capable of receiving an ultrasonic acoustical pulse from the fluid and providing an electrical pulse corresponding to the received acoustical pulse,
controlling in accordance with control signals both transducers so that during one part of a fluid flow rate measurement the first transducer transmits an ultrasonic acoustical pulse and the second transducer receives an acoustical pulse that has passed through the fluid and so that during another part of the measurement the second transducer transmits an ultrasonic acoustical pulse into the fluid and the first transducer receives an ultrasonic acoustical pulse from the fluid, and
providing a travel time signal corresponding to the travel times of the acoustical pulses for both parts of the measurement in accordance with the electrical pulses provided by both transducer means;
carrying control signals from the surface to the sonde with a cable,
carrying the travel time signal and the diameter signal to the surface with the cable,
providing the control signals to the cable at the surface, and deriving the flow rate of the fluid flowing in the borehole in accordance with the travel time signal and the diameter signal.

13. A method as described in claim 12 in which the control means includes:
for providing at least two pulses in accordance with a first control signal during a measurement, and
applying a first pulse from the pulse step to the first transducer and passing an electrical pulse from the second transducer during the one part of the measurement,
applying a second pulse from the pulse step to the second transducer and passing an electrical pulse from the first transducer during the other part of the measurement.

14. A method as described in claim 13 in which the signal step includes:
providing timing pulses,
providing an enabling signal for each part of the measurement in accordance with the pulses from the pulse step and the transducer's electrical pulses, and
passing the timing pulses to the cable as the travel time signal in accordance with the enabling signal.

15. A method as described in claim 14 in which the deriving step includes:
deriving the velocity v of the fluid in accordance with the travel time signals and the following equation:

$$v = (d/2 \cos \theta)(1/t_1 - 1/t_2)$$

where $t_1$ is the travel time of an acoustical pulse from the first transducer to the second transducer, $t_2$ is the travel time of an acoustical pulse from the second transducer to the first transducer d is the path distance between the first and second transducers and $\theta$ is the angle between the transmitted pulse and the sonde axis.

16. A method as described in claim 15 in which the deriving step includes:
deriving the flow rate of the fluid in the borehole in accordance with the travel time signal, the diameter signal and the following equation:

$$FR = 1.4(D^2 - s^2)v$$

where FR is the flow rate in barrels per day, D is the diameter of the casing or borehole in inches, s is the diameter of the sonde in inches, and 1.4 is the unit conversion constant.

17. A method as described in claim 16 further comprising the step of extending one of the transducer outside of the sonde in such a manner that there is a direct path between both transducers for an acoustical pulse to travel.

18. A method as described in claim 16 further comprising the steps of:
spatially arranging the transducers with each other so that there is an indirect path between both transducers.

19. A well logging method for monitoring the velocity of a fluid flowing in a borehole traversing an earth formation comprising the steps of:
using first and second transducers in a sonde in the borehole, each transducer being capable of transmitting an ultrasonic acoustical pulse into the fluid or capable of receiving an ultrasonic acoustical pulse from the fluid and providing an electrical pulse corresponding to the received acoustical pulse,
extending one of the transducers outside of the sonde in such a manner that there is a direct path between both transducer means for an acoustical pulse to travel,
controlling in accordance with control signals both transducers so that during one part of a fluid flow rate measurement the first transducer transmits an ultrasonic acoustical pulse and the second transducer receives an acoustical pulse that has passed through the fluid and so that during another part of the measurement the second transducer transmits an ultrasonic acoustical pulse into the fluid and the first transducer receives an ultrasonic acoustical pulse from the fluid, and
providing a travel time signal corresponding to the travel times of the acoustical pulses for both parts of the measurement in accordance with the electrical pulses provided by both transducers;
carrying control signals from the surface to the sonde,
carrying the travel time signal to the surface with the cable; and
providing the control signals to the cable, and
deriving the velocity of the fluid flowing in the borehole in accordance with the travel time signal.

20. A method as described in claim 19 in which the control step includes:
providing at least two pulses in accordance with a first control signal during a measurement, and
applying a first pulse from the pulse step to the first transducer and passing an electrical pulse from the second transducer during the one part of the measurement,
applying a second pulse from the pulse step to the second transducer and passing an electrical pulse from the first transducer during the other part of the measurement.

21. A system as described in claim 20 in which the signal stpe includes:
providing timing pulses,
providing an enabling signal for each part of the measurement in accordance with the pulses from the pulse step and the transducer's electrical pulses, and
passing the timing pulses to the cable as the travel time signal in accordance with the enabling signal.

22. A method as described in claim 21 in which the deriving means derives the velocity v of the fluid in accordance with the travel time signals and the following equation:

$$v = (d/2 \cos \theta)(1/t_1 - 1/t_2)$$

where $t_1$ is the travel time of an acoustical pulse from the first transducer to the second transducer, $t_2$ is the travel time of an acoustical pulse from the second transducer to the first transducer, d is the path distance between the first and second transducer means and $\theta$ is the angle between the transmitted pulse and the sonde axis.

* * * * *